C. L. GRUMME.
SLED.
APPLICATION FILED MAR. 3, 1916.
1,280,988.
Patented Oct. 8, 1918.
2 SHEETS—SHEET 1.
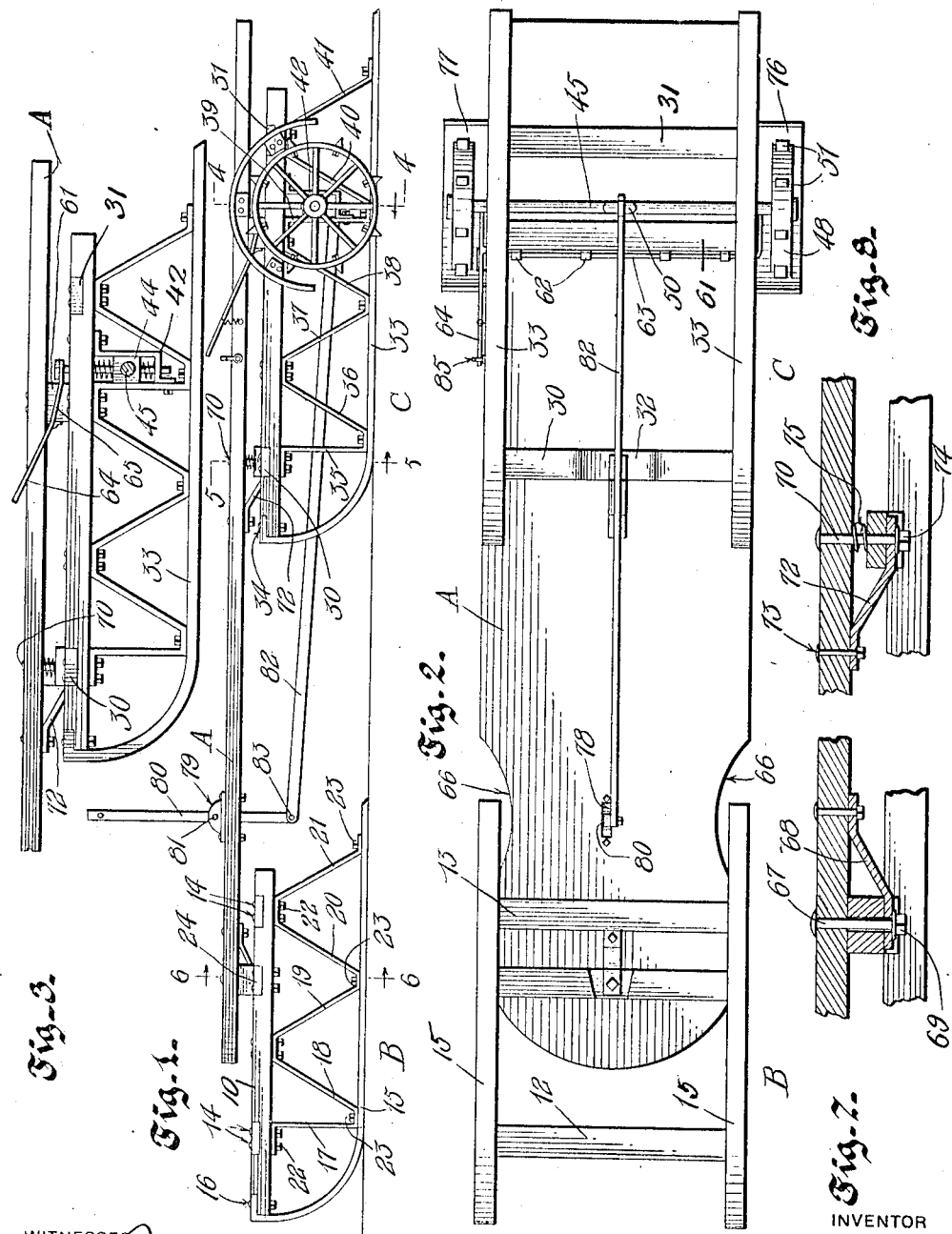
WITNESSES
Roland Booth
J Reamy Kelly
INVENTOR
Carey L. Grumme
BY
Richard B. Owen,
ATTORNEY

C. L. GRUMME.
SLED.
APPLICATION FILED MAR. 3, 1916.

1,280,988.

Patented Oct. 8, 1918.
2 SHEETS—SHEET 2.

WITNESSES
Roland T. Booth
J. Reaney Kelly

INVENTOR
Carey L. Grumme.
BY
Richard B. Owen.
ATTORNEY

UNITED STATES PATENT OFFICE.

CAREY L. GRUMME, OF AKRON, OHIO.

SLED.

1,280,988. Specification of Letters Patent. Patented Oct. 8, 1918.

Application filed March 3, 1916. Serial No. 81,938.

*To all whom it may concern:*

Be it known that I, CAREY L. GRUMME, a citizen of the United States, residing at Akron, in the county of Summit and State of Ohio, have invented certain new and useful Improvements in Sleds, of which the following is a specification.

This invention has relation to the class of sleds and as its primary object it contemplates the provision of a novel device of that nature that may be propelled by the operator or occupants of the sled at the desired speed or which may be used for coasting purposes, if it is so desired.

Another object of my invention is to provide a novel device of the nature aforesaid wherein the propelling wheels are mounted to be bodily movable so that they may be quickly and easily moved into or out of an operative position and which provides means whereby the said propelling wheels may be firmly held in an inoperative position, should the sled be used for coasting purposes or otherwise.

A further object of my invention is to provide a device of the type in question that is extremely simple in construction, strong and durable, and highly practical from both the standpoint of the manufacturer and the standpoint of the user; and which, it is believed, may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claims.

In the accompanying drawings, wherein like characters designate like parts throughout the several views:—

Figure 1 is a view in side elevation showing my invention as in its preferred embodiment; the propelling wheels being shown in an operative relation.

Fig. 2 is a view in bottom plan, showing the parts in a position as shown in Fig. 1.

Fig. 3 is a view in side elevation, showing the rear bob in detail.

Fig. 7 is a fragmentary view of the forward portion of the sled, showing in detail the means for connecting the body of the sled to the front bob;

Fig. 8 is a fragmentary view showing in detail the means for connecting the body of the sled to the rear bob.

My invention as shown in the present embodiment consists generally of a body A, supported adjacent its respective extremities by means of bobs B and C respectively. Consequently, each bob will be subsequently described in detail, while such description will be followed by a general portrayal of the usual operation.

Figure 6:
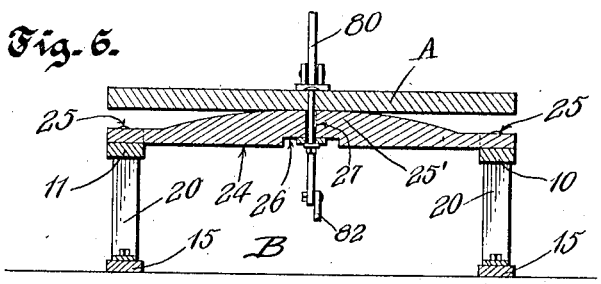
Fig. 6 is a cross section, taken on line 6—6 of Fig. 1.
Figure 9:
Fig. 9 is a fragmentary view of one of the propelling wheels, showing in detail the detachable teeth thereof.

Front bob B consists generally of spaced supporting beams 10 and 11, connected at points adjacent their opposite ends by cross bars 12 and 13, as at 14. Runners 15 have their forward ends connected with beams 10 and 11, as at 16 and have their intermediate portion arranged to be held in spaced relation to said beams through the instrumentality of suitable standards 17, 18, 19, 20 and 21. Said standards may be in turn connected with beams 10 and 11 and runners 15 as at 22 and 23 respectively. The beams 10 and 11 are further connected by a cross arm 24 as at 25, said cross arm being enlarged slightly intermediate its ends as at 25' to provide a bearing portion for sled body A, such as will be hereinafter described. Arm 24 is cut away as at 26 adjacent the enlargement 25' and is further provided with a through aperture 27 which communicates with its upper and lower faces as clearly shown in Fig. 6.

Runners 15 may be of suitable configuration and constructed of the usual material, steel, while standards 17, 18, 19, 20 and 21 may be formed of metal and cast integral with each other as shown in the present embodiment, should occasion so require. This latter, however, is an arbitrary feature and it is to be understood that I do not limit myself to the present showing.

Rear bob C consists of supporting beams 28 and 29 (see Fig. 4) which are connected at suitable points by cross bars 30 and 31, the cross bar 30 being slightly raised intermediate its ends as at 32 in order to provide a suitable bearing portion, as will subsequently appear. Runners 33 which have their forward ends connected with beams 28 and 29, as at 34, support said beams, while standards 35, 36, 37, 38, 39, 40 and 41, may be interposed between said beams and the runners in order to complete the rear bob.

Figure 4:
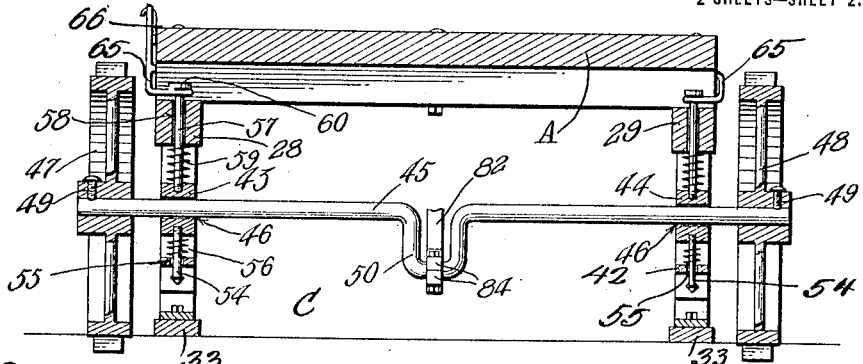
Fig. 4 is a view in section, taken on line 4—4 of Fig. 1.

Braces 42 are arranged in spaced relation to standards 39 in order to form a suitable guide way, while bearing blocks 43 and 44 operate in said guide ways as clearly shown in Fig. 4. An axle 45 has its end portions journaled through openings 46 in bearing blocks 43 and 44, its respective terminal portions carrying propelling wheels 47 and 48. Suitable means as shown at 49 may be used to retain the wheels in a relation rotatable bodily with axle 45. Intermediate its ends, axle 45 carries a crank portion 50, that serves the purpose subsequently appearing.

Figure 5:
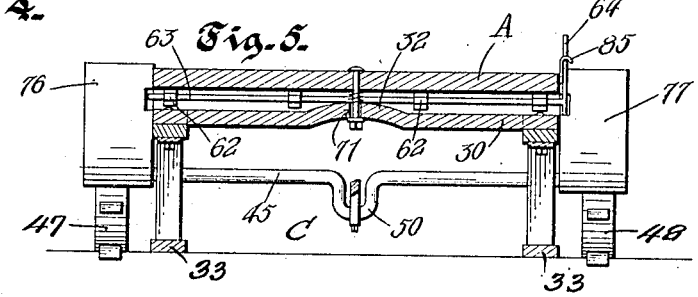
Fig. 5 is a view in cross section, taken on line 5—5 of Fig. 1.

Propelling wheels 47 and 48 have located about their periphery, a series of equi-distantly spaced teeth or calks 51, the said teeth or calks having shanks 52 passed through the rim of the wheel and detachably held in relation therewith, through the medium of fastening members 53. Consequently, it will be seen that by imparting rotary movement to the shaft 45, said propelling wheels may be operated, so as to properly propel the respective bob. As shown in Fig. 4, bearing blocks 43 and 44 carry depending studs 54, which are passed through apertures 55 in brace members 42; coil springs 56 being arranged about the studs 54 between the brace members 42 and said bearing blocks in order to cushion said bearing blocks upon movement in one direction. The bearing blocks above mentioned also carry upstanding studs 57 that project through suitable apertures 58 in supporting beams 28 and 29 while coil springs 59 are interposed between said bearing blocks and said beams in order to cushion said bearing blocks upon upward movement. At their upper ends, studs 57 are provided with head portions 60 that serve the purpose subsequently described. Adjacent studs 57, beams 28 and 29 carry a transverse spacing block 61 that is provided throughout its general extent with spaced bearings 62, as clearly shown in Fig. 5. The rod 63 is journaled through spaced bearings 62, one end of said rod terminating in an operating lever 64 that projects upwardly from the respective bob, as shown in Fig. 3. Rod 63 also carries rearwardly directed arms 65 whose free terminals embrace studs 57 below head portions 60 whereby upon proper manipulation of operating lever 64, said propelling wheels may be bodily moved, together with axle 45, in order to become inoperative. In other words, upon bearing down upon the free end of operating lever 64, the studs 57 will be moved upwardly, and consequently cause a like movement of axle 45 and propelling wheels 47 and 48, that are carried thereby. This permits the operator to quickly draw propelling wheels 47 and 48 out of a ground engaging position and thus permits the sled to be used for coasting purposes. In order to retain operating lever 64 in a certain position, I may provide body member A of the sled with suitable means, such as will subsequently appear.

Body member A, as clearly shown in Fig. 2, may be formed of any desired material such as wood, light metal, or the like, and is preferably cut away slightly adjacent its forward end, as at 66 in order to permit guiding of the front bob, as will presently appear. At its forward end, body member A carries a coupling pin 67, that may be passed through aperture 27 and cross arm 24 of the front bob, as shown in Fig. 7, while a securing member 68, that is fixed at one end to body member A may receive the lower portion of coupling pin 67 prior to the positioning of the fastening nut 69 thereon. Likewise, adjacent its rear end, body member A carries a coupling pin 70, which is passed through a suitable aperture 71 in cross member 30 of the rear bob, while a securing member 72 that is carried by body member A as at 73 may be engaged with the said coupling pin in the manner aforesaid, prior to the positioning of nut 74 in place. In this connection I find it expedient to interpose a cushion spring 75 between cross member 30 and body member A, in order to compensate for slight relative movement.

Body member A further carries oppositely projecting hoods or mud guards 76 and 77 to project over and above propelling wheels 47 and 48 so as to prevent the clothing of the occupants of the sled from becoming entangled in the teeth or calks 51 of said propelling wheels.

The propelling wheels are normally spaced quite a distance from said hoods or mud guards whereby their adjustment vertically with respect to the rear guards will be permitted.

With a view of providing means whereby the operator may impart movement to shaft 45, I provide base member A with a suitable receiving slot 78, to each side of which are fixed bearings 79. Operating lever 80 is passed through slot 78, such as shown in Fig. 1 and pivotally connected to bearings 79 as at 81, whereby its upper end may be rocked by the operator. At its lower end, operating lever 80 has connection with a drive bar 82 as at 83, said drive bar, being in turn connected with crank 50, as at 84. Consequently, upon oscillatory movement of operating lever 80, reciprocal movement will be imparted to drive bar 82 which will in turn cause proper rotation of axle 45 and the consequent driving of propelling wheels 47 and 48.

The operation of my invention is substantially as follows:—

Assuming that the parts are in the position shown in Fig. 1, the operator sitting astride body member A, rests his feet upon the rear end of beams 10 and 11 as is obvious. Motion then transmitted to operating lever 80 will cause the proper propelling of wheels 47 and 48 and the consequent movement of the sled structure in the desired direction. Should the operator so desire, operating lever 64 may be moved so as to draw propelling wheels 47 and 48 out of a ground engaging position and thus permit the sled structure to be used for coasting purposes. When in this latter position, operating lever 64 may be securely held against retrograde movement through the instrumentality of a latch 85. On the other hand, it is obvious that the operator may properly guide the sled by movement of the forward bob B.

From the foregoing, it is believed that the advantages and novel features of my invention will be readily understood and, therefore, further detail description is deemed unnecessary.

In reducing my invention to practice, I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention, as defined in the appended claims.

Having thus fully described my invention, what I claim as new and desire to secure by Letters Patent is:—

1. In a sled, comprising a body and runners, vertical guideways intermediate the body and runners, bearing blocks movable vertically in the guideways, an axle journaled in the bearing blocks, means yieldably holding the bearing blocks in a given position, studs carried by the bearing blocks, a rocker shaft mounted on the body and having arms engaging said studs, and operating means connected with the rocker shaft to swing the arms to vertically adjust the axle to move the propelling means into and out of a ground engaging position.

2. In a sled, comprising a body structure and runners, bearing blocks mounted on the sled to move vertically, studs carried by said bearing blocks, propelling means including a shaft rotatably mounted in the bearing blocks, a rocker shaft mounted on the body and having opposed depending arms engaging the studs, and operating means for the rocker shaft to swing the arms thereof to vertically adjust the bearing blocks to move the propelling means into and out of the ground engaging position.

In testimony whereof I affix my signature in presence of two witnesses.

CAREY L. GRUMME.

Witnesses:
K. P. HASKINS,
E. C. MYERS.

Copies of this patent may be obtained for five cents each, by addressing the "Commissioner of Patents, Washington, D. C."